United States Patent
Wilkie et al.

(10) Patent No.: US 7,184,397 B1
(45) Date of Patent: Feb. 27, 2007

(54) REAL-TIME SOURCE ACTIVATED SHAPING

(75) Inventors: George Alexander Reid Wilkie, Dalgety Bay (GB); Gregory Alan Fowler, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 1060 days.

(21) Appl. No.: 09/998,864

(22) Filed: Nov. 30, 2001

(51) Int. Cl.
*H04J 1/16* (2006.01)
*H04J 3/14* (2006.01)
*H04L 1/00* (2006.01)
*H04L 12/26* (2006.01)

(52) U.S. Cl. ............... 370/229; 370/230; 370/235; 370/468

(58) Field of Classification Search ........ 370/229–235, 370/352–356, 468
See application file for complete search history.

(56) References Cited

U.S. PATENT DOCUMENTS

| | | | |
|---|---|---|---|
| 5,781,532 A * | 7/1998 | Watt | 370/236 |
| 6,038,216 A * | 3/2000 | Packer | 370/231 |
| 6,038,594 A * | 3/2000 | Puente et al. | 709/217 |
| 6,370,116 B1 * | 4/2002 | Giroux et al. | 370/232 |
| 6,427,174 B1 * | 7/2002 | Sitaraman et al. | 709/245 |
| 6,457,051 B1 * | 9/2002 | Riddle et al. | 709/224 |
| 6,483,839 B1 * | 11/2002 | Gemar et al. | 370/395.42 |
| 6,577,597 B1 * | 6/2003 | Natarajan et al. | 370/232 |
| 6,594,234 B1 * | 7/2003 | Chard et al. | 370/236 |
| 6,643,515 B2 * | 11/2003 | Macridis et al. | 455/450 |
| 6,707,799 B1 * | 3/2004 | Chui | 370/282 |
| 6,707,826 B1 * | 3/2004 | Gorday et al. | 370/468 |
| 6,738,371 B1 * | 5/2004 | Ayres | 370/352 |
| 6,891,832 B1 * | 5/2005 | Chien et al. | 370/395.1 |
| 6,975,594 B1 * | 12/2005 | Byers | 370/238 |
| 2002/0040396 A1 * | 4/2002 | Yoshihara et al. | 709/225 |
| 2002/0089929 A1 * | 7/2002 | Tallegas et al. | 370/230 |
| 2002/0097675 A1 * | 7/2002 | Fowler et al. | 370/230 |
| 2002/0176430 A1 * | 11/2002 | Sangha et al. | 370/412 |
| 2004/0141494 A1 * | 7/2004 | Beshai et al. | 370/352 |
| 2004/0202191 A1 * | 10/2004 | Vrabel | 370/412 |
| 2004/0203743 A1 * | 10/2004 | Macridis et al. | 455/427 |
| 2005/0088975 A1 * | 4/2005 | Wildfeuer et al. | 370/235 |
| 2005/0175014 A1 * | 8/2005 | Patrick | 370/395.43 |

* cited by examiner

*Primary Examiner*—Chirag G. Shah
(74) *Attorney, Agent, or Firm*—Marger Johnson & McCollom, P.C.

(57) ABSTRACT

A network device. The network device includes an input port to receive input data and a transmission port to transmit data. The device also includes a detector to detect real-time input data and a controller to set the maximum transmission rate equal to a first traffic rate when the detector detects real-time input data. Various methods for detecting real-time data are also included.

33 Claims, 3 Drawing Sheets

REAL-TIME SOURCE ACTIVATED SHAPING

BACKGROUND

1. Field

This disclosure relates to real-time transmission over data networks, more particularly to methods and devices used to improve quality of service for real-time transmission over data networks.

2. Background

As more sophisticated equipment has become available, transmission of data from real-time sources such as voice and video has become more prevalent. Data networks are often designed to accommodate the maximum bandwidth required. However, the network traffic may 'burst' up to that capacity, but more often runs at a lower rate. This provides excess capacity in data networks to transmit such things as video and voice. Enterprises, such as companies and government entities, have found the use of data networks for voice transmission, especially, to be a cost-effective alternative to using the public switched transmission network (PSTN).

However, the use of data networks for real-time transmissions such as voice and voice raises concerns about the quality of service (QoS). Network access providers typically offer a range of service levels to enterprises for corresponding fees. The network may be 'purchased' by the enterprise as a virtual circuit, which is a logical circuit created to ensure reliable communication between network devices.

One concern about QoS is congestion on the network. Even though the network may have excess capacity at some times, at other time it may be 'full' and there may be delays in transmission. If the transmissions are data packets or modules, there is generally not a problem except the sender and receiver's inconvenience. However, if the transmissions are real-time data packets or modules, the delay may be fatal to the overall transmission, since the packets or modules have to arrive with enough time to be decoded into a sequential data stream. Delayed packets or modules will cause the sequential order to be disrupted and will adversely affect the reception of the real-time transmission.

A possible solution is to have a VC dedicated to voice. However, this would typically require an enterprise or user to have two VCs, one dedicated to voice and one for data. Even if the enterprise or user only used one VC, the costs would be greater. It would be preferable for the voice and data traffic to share a VC but without sacrificing quality of service for the voice, and still have a reasonable cost.

SUMMARY

One aspect of the disclosure is a network device. The network device includes an input port to receive input data and a transmission port to transmit data. The device also includes a detector to detect real-time input data and a controller to set the maximum transmission rate equal to a first traffic rate when the detector detects real-time input data. A method of managing traffic in the presence of real-time data is also included. The method detects the real-time data and then sets a maximum transmission rate to a first traffic rate.

BRIEF DESCRIPTION OF THE DRAWINGS

The invention may be best understood by reading the disclosure with reference to the drawings, wherein.

DETAILED DESCRIPTION OF THE EMBODIMENTS

Figure 1:
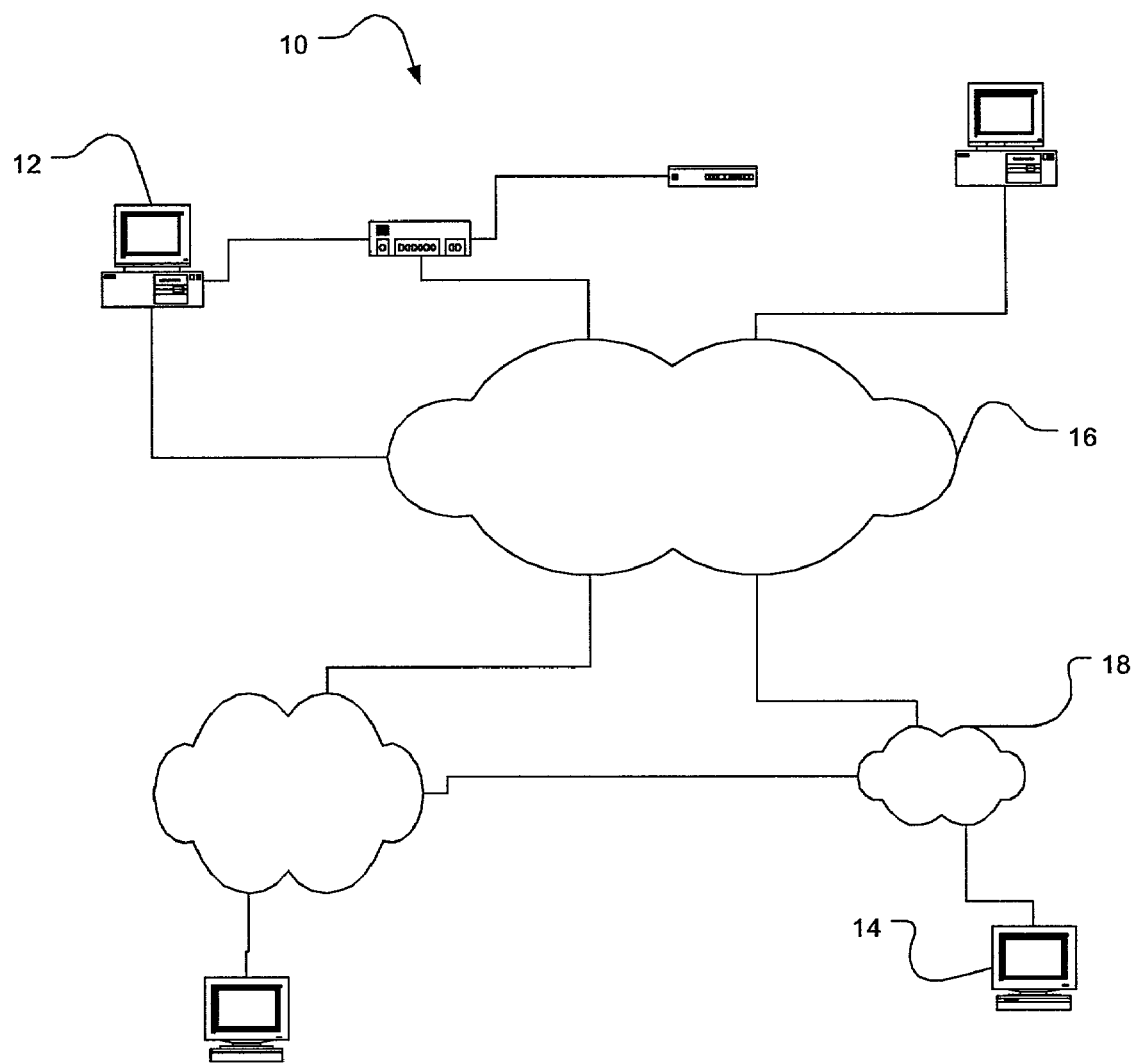
FIG. 1 shows an embodiment of a network having a virtual circuit, in accordance with the invention.

The issues raised by the use of data networks for real-time transmissions have given rise to some possible solutions other than the dedication of a virtual circuit (VC) to voice, discussed above. Many network providers offer two levels of bandwidth or 'information rate.' One level may be referred to as a 'committed information rate (CIR),' being the maximum bandwidth guaranteed for a particular VC. This may also be referred to here as the first traffic rate. A second level of bandwidth may be made available to the users on a non-guaranteed basis, sometimes referred to as an 'excess information rate (EIR).' This may also be referred to here as the second traffic rate. This may be viewed as 'best effort' data, where the network will make best efforts to get the data through.

The use of EIR allows users to occasionally exceed their CIR, allowing them a higher maximum transmission rate, defined here as the rate at which their information actually flows across the network, between these two rates. Networks may mark EIR traffic to notify the network that the data may be discarded if necessary. For example, in Frame Relay networks, the data would be marked DE, for discard eligible. Usually, the network will only discard data to alleviate congestion. In some cases, for example, EIR data may be discarded to preserve the CIR guarantees made for the VCs.

One possibility for users wanted a guaranteed data rate for their real-time data is to pay for a committed information rate that is sufficient for both their voice and data traffic, with no excess information rate. This would guarantee that all data would get through and the quality of service would be maintained. A problem with this approach lies in both the cost and the inability of customers to have bursts of traffic over their CIR.

Another possibility is to use a CIR sufficient for the real-time traffic and some percentage of the data. The EIR would be available for best efforts data as required. All the data traffic would be marked as discardable and the user would reduce the total traffic rate offered towards the CIR in response to congestion conditions in the network, including congestion notifications. A possible risk here is that the user is offering data for discard ahead of other users, and any delays in congestion notifications may allow congestion to occur, resulting in discards being made that might not have been necessary. Also, the network may not take discard markings made by the user into account, and therefore may not protect the real-time traffic as desired.

Application of this invention may result in a better solution to the problem. Application of the invention will generally allow users to detect or otherwise identify real-time data in the VC and allows the user to reduce the maximum transmission rate to the CIR while real-time data is present. This ensures that all traffic is within the CIR when real-time data is present, and should have guaranteed delivery. It also allows full use of the EIR when no real-time traffic is present. This will also mitigate the users' costs, as they can pay for the necessary level of CIR as they determine their needs, not based upon a guaranteed level of delivery higher than they need when real-time traffic is not present.

Turning now to FIG. 1, an overall network configuration can be used as context for understanding the invention. This is only intended as an example, and is not intended to limit application of the invention in any way. The network 10 may comprise several individual machines, or network devices, such as 12 and 14 and may include smaller networks such as 16. A virtual circuit may be set up between machines 12 and 14, which will define a logical circuit between these two machines across the network 10, which includes networks 16 and 18.

The machines 12 and 14, as well as any intervening machines may be any type of equipment that communicates across the network, including computers, workstations, routers, multi-channel adapters (MCAs), multi-channel concentrators (MCCs), etc. These network-capable machines will be referred to here as network devices.

Figure 2:
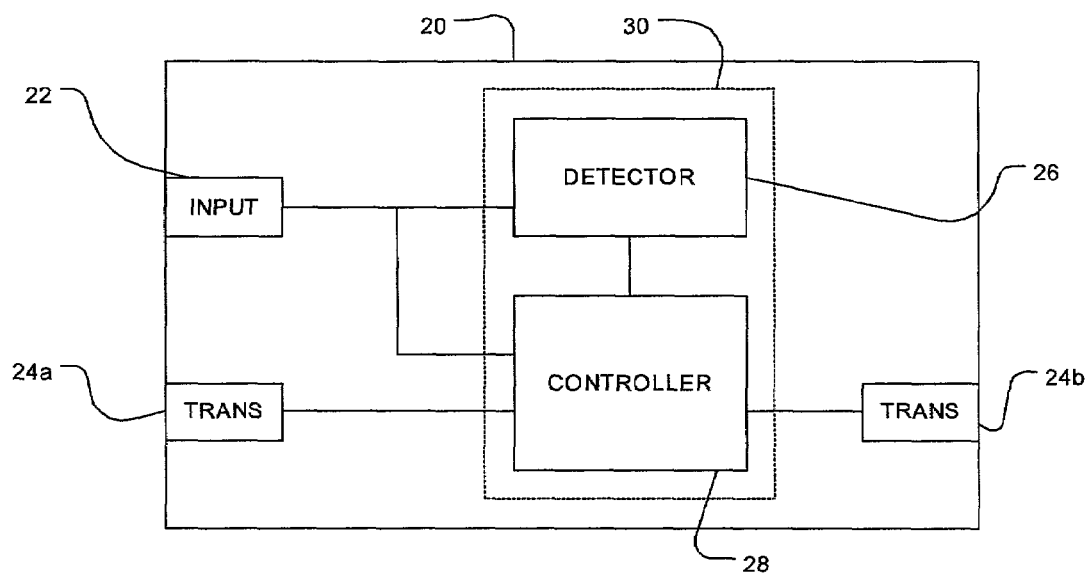
FIG. 2 shows an embodiment of a network device, in accordance with the invention.

One embodiment of a network device in accordance with the invention is shown in FIG. 2. The network device 20 has an input port 22 and a transmission port 24a. It may also have transmission port 24b. Similarly, it may transmit and receive through the same port. A detector module 26 is capable of detecting the presence of real-time data, which will be discussed in more detail later. A controller 28 is capable of reducing the maximum transmission rate for the device to the first traffic rate in response to the presence of real-time data. The controller and the detector may reside on the same component 30, such as a microcontroller or a processor. It may also be an application specific integrated circuit (ASIC), a general-purpose processor or central processing unit, or a digital signal processor, as examples.

Figure 3:
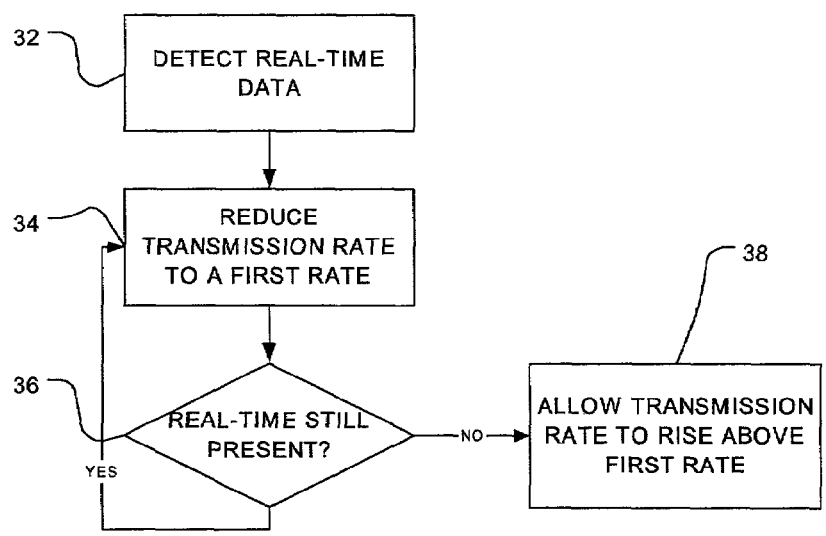
FIG. 3 shows an embodiment of a method of managing traffic in the presence of real-time data, in accordance with the invention.

One embodiment of a method for managing traffic in a network device is shown in FIG. 3. At 32, real-time data is detected. As will be discussed in more detail, the real-time data may actually be data or may be real-time traffic. Traffic would include packetized data that may not be individually analyzed to determine if the data inside the packet is actually real-time data. When real-time data is detected, the maximum transmission rate is reduced to a first traffic rate, referred to as the CIR in the above discussion.

Optionally, the method may include a recovery process in which the cessation of real-time data is also monitored. Upon cessation of real-time data, or the absence of real-time data, the network device would then allow the maximum transmission rate to exceed the first rate. Generally, the maximum transmission rate would be bounded by the first transmission rate and a second transmission rate, the two rates being the CIR and the EIR, respectively. However, the recovery process is not necessary for application of the invention.

The detection of real-time data at 32 may be accomplished in many different ways. For example, the packets of data flowing through, from or to a network device could be examined for particular characteristics that identify them as real-time data. For example, the data inside the payload may have particular characteristics or profiles that indicate that it is real time data. Alternatively, the header may identify the source of the data, which in turn may be known to the network device as a real-time source, such as a voice coder/decoder (codec) or a video terminal attached to the network. This embodiment is not limited to any particular place in the VC. It may be applied at the originating end, the receiving end or by any device in between.

Similarly, if the real-time data were identified on a packet basis, the optional recovery process may include a timer in the network device. Each time a real-time packet is identified, the timer is reset. The controller would then monitor the timer for expiration. If no real-time packets are identified within the period of time set by the timer, the controller releases the maximum transmission rate and allows it to exceed the first traffic rate.

Figure 4:
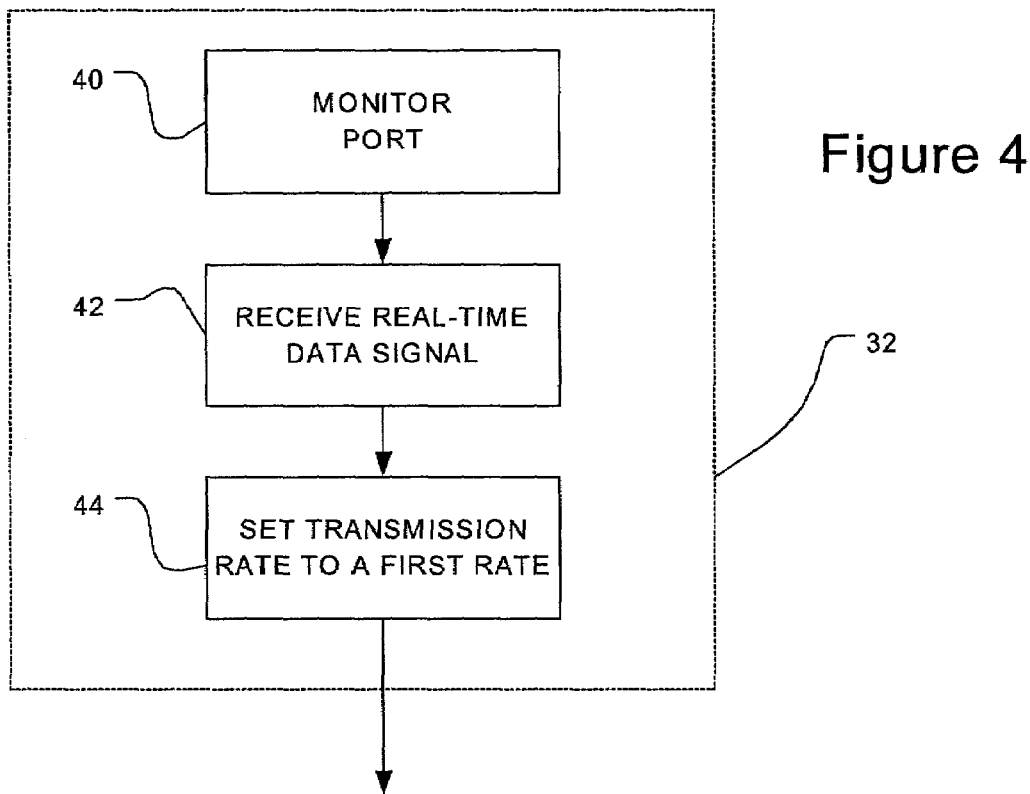
FIG. 4 shows an embodiment of a method for detecting real-time data, in accordance with the invention.

Other options for detection of real-time data may be more specific to the location of the device in the network. For example, an originating or receiving end of the VC may have specialized equipment such as voice or video codecs that identify the data as real-time. This equipment is referred to here as sources of real-time content. In the case of a network device electrically coupled to a real-time source, the real-time source may indicate its impending transmission of data. For example, the video or voice codec may take control of a data bus, indicating that it is about to transmit voice or video data through the codec's port on the bus. This would allow the network device to also become aware that real-time data transmission is imminent and to set the maximum transmission rate to the first transmission rate. This is shown in more detail in FIG. 4.

Process 32 from FIG. 3 has been expanded to include monitoring a port electrically coupled to a source of real-time data at 40. A signal is received at 42 that indicates the real-time data transmission is about to occur. In response to the signal, the maximum transmission rate is set to the first transmission rate at 44.

In this particular embodiment, the determination of whether real-time data is present is altered slightly from FIG. 3. Here, the determination is whether a second signal indicating cessation of the real-time data transmission is received at 36. This then determines the point at which the maximum transmission rate is allowed to exceed the first information rate.

Figure 5:
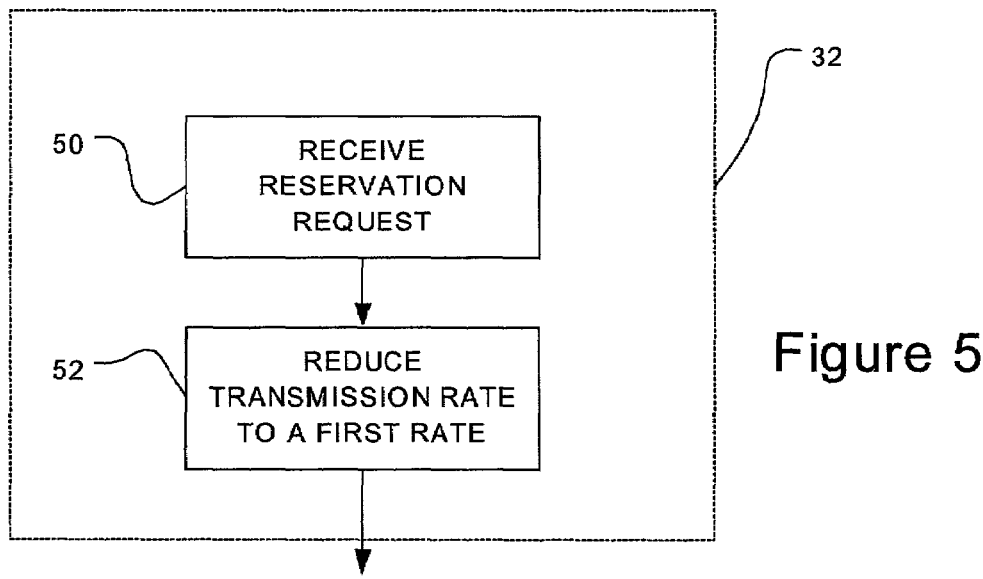
FIG. 5 shows an alternative embodiment of a method for detecting real-time data, in accordance with the invention.

The specifics of implementation are left largely to the system designer based upon the features and capabilities of the networks. For example, a network may use some source of resource reservation, such as the resource reservation protocol (RSVP) used in Internet Protocol (IP) networks, which may be carried on Frame Relay networks. In this case, shown in FIG. 5, the detection of real-time data will be the reception of the resource reservation request at 50 indicating the that maximum transmission rate should be reduced to the first traffic rate at 52. The first traffic rate may be 'announced' by the reservation request, or it may be predetermined for the network devices receiving the request.

Recovery of the maximum transmission rate in this type of scheme generally involves receiving some sort of release message that indicates that the resources are no longer needed. This would then trigger the release of the maximum transmission rate and allowing it to exceed the first traffic rate.

There is no specific limitation as to the type of network to which this invention can be applied. Currently, VCs are more common on Frame Relay, Asynchronous Transfer Mode, Internet Protocol tunnels, and local area network links, as examples. However, each type of network generally has an analogous structure or capability to those defined above and this invention could be applied to any network that includes transmission of real-time data.

The network devices may include the capabilities set forth above, or they may be upgraded to include those capabilities. Generally, the upgrade will be to the software code that operates the various types of devices. In that instance, an article will include machine-readable code that, when executed, causes the machine to perform the methods of the invention.

Thus, although there has been described to this point a particular embodiment for a method and apparatus for real-time source activated shaping, it is not intended that such specific references be considered as limitations upon the scope of this invention except in-so-far as set forth in the following claims.

What is claimed is:

1. A network device, comprising:
    an input port to receive input data, wherein the input data comprises both real-time data and non real-time data;
    a transmission port to transmit the input data at a transmission rate, wherein the transmission rate is a variable between a committed information rate and an excess information rate that is higher than the committed information rate;
    a detector to detect real-time input data;
    a controller to set a maximum transmission rate for the input data including the non real-time data equal to the committed information rate when the detector detects real-time input data.

2. The network device of claim 1, wherein the network device includes a timer to track occurrences of real-time input data.

3. The network device of claim 2, wherein the controller increases the maximum transmission rate above the committed information rate when the timer expires.

4. The network device of claim 1, wherein the real-time input data is voice data.

5. The network device of claim 1, wherein the real-time input data is video data.

6. The network device of claim 1, wherein the detector detects a characteristic of the input data to identify the input data as real-time input data.

7. The network device of claim 1, wherein the detector detects real-time input data by determining a source address.

8. The network device of claim 1, wherein the detector detects real-time input data by determining a source port.

9. A network device, transmitting data at a maximum transmission rate which is greater than a committed information rate comprising:
    means for detecting real-time data; and
    means for reducing the maximum transmission rate to the committed information rate for both real-time data and non real-time data in response to the real-time data.

10. The network device of claim 9, wherein the network device further comprises a means for detecting a cessation of the real-time data and a means for allowing the maximum transmission rate to exceed the committed information rate.

11. The network device of claim 9, wherein the means for detecting further comprises a detector module.

12. The network device of claim 9, wherein the means for reducing a maximum transmission rate further comprises a controller.

13. The network device of claim 9, wherein the means for detecting and the means for reducing a maximum transmission rate are included in one component.

14. A method, comprising:
    transmitting data at a maximum transmission rate which is greater than a committed information rate;
    detecting real-time data in a network device; and
    reducing the maximum transmission rate to the committed information rate for both real-time data and non real-time data in response to the real-time data.

15. The method of claim 14, wherein the method further comprises detecting a cessation of the real-time data and allowing the maximum transmission rate to exceed the committed information rate.

16. The method of claim 14, wherein detecting a cessation of the real-time data further comprises monitoring a timer for expiration, wherein the timer is reset upon each occurrence of the real-time data.

17. The method of claim 14, wherein detecting real-time traffic data further comprises examining data as it passes through a network device.

18. The method of claim 17, wherein the data further comprises packets.

19. The method of claim 14, wherein detecting real-time data further comprises monitoring a port electrically coupled to a source of real-time data.

20. The method of claim 14, wherein detecting real-time data further comprises reception of a resource request.

21. An article containing computer readable code that, when executed, causes the computer to:
    transmit data at a maximum transmission rate which is greater than a committed information rate;
    detect real-time data; and
    reduce the maximum transmission rate to the committed information rate for both real-time data and non real-time data in response to the real-time data.

22. The article of claim 21, wherein the code further comprises code that, when executed, causes the computer to:
    detect a cessation of the real-time data; and
    allow the maximum transmission rate to exceed the committed information rate.

23. The article of claim 21, wherein the code, when executed, causing the computer to detect a cessation of the real-time data further causes the computer to monitor a time for expiration, wherein the time is reset upon each occurrence of the real-time data.

24. A method, comprising:
    transmitting data at a maximum transmission rate which is greater than a committed information rate;
    monitoring a port electrically coupled to a real-time source for data from the source; and
    reducing the maximum transmission rate to the committed information rate for both real-time data and non real-time data prior to the real-time data being transmitted from the source.

25. The method of claim 24, wherein the real-time source is a voice source.

26. The method of claim 25, wherein the real-time source is a video source.

27. The method of claim 24, wherein reducing a maximum transmission rate further comprises:
    receiving a signal from the real-time source that data from that source is going to be transmitted.

28. The method of claim 24, wherein the method further comprises allowing the maximum transmission rate to exceed the committed information rate upon cessation of the real-time data being transmitted from the source.

29. The method of claim 28, wherein the method further comprises receiving a signal from a source indicating that the real-time source has ceased transmission of the real-time data.

30. A method, comprising:
    transmitting data at a maximum transmission rate which is greater than a committed information rate;
    receiving a resource reservation request for real-time data transmitted along a path in a network; and reducing the maximum transmission rate to the committed information rate for both real-time data and non real-time data in response to the request.

31. The method of claim 30, wherein the method further comprises:

receiving a resource release upon the cessation of the real-time data being transmitted along the path; and allowing the maximum transmission rate to exceed the committed information rate.

32. The method of claim 30, wherein the committed information rate is provided in the resource reservation request.

33. The method of claim 30, wherein the committed information rate is predetermined.

* * * * *

UNITED STATES PATENT AND TRADEMARK OFFICE
CERTIFICATE OF CORRECTION

PATENT NO. : 7,184,397 B1 Page 1 of 1
APPLICATION NO. : 09/998864
DATED : February 27, 2007
INVENTOR(S) : George Alexander Reid Wilkie and Gregory Alan Fowler It is certified that error appears in the above-identified patent and that said Letters Patent is hereby corrected as shown below:

At column 6, line 67, please replace "transmitted along a path" with
--to be transmitted along a path--

Signed and Sealed this

Twenty-fifth Day of December, 2007

JON W. DUDAS
*Director of the United States Patent and Trademark Office*